US009785473B2

(12) United States Patent
Moyer et al.

(10) Patent No.: US 9,785,473 B2
(45) Date of Patent: Oct. 10, 2017

(54) CONFIGURABLE PER-TASK STATE COUNTERS FOR PROCESSING CORES IN MULTI-TASKING PROCESSING SYSTEMS

(71) Applicants: William C. Moyer, Dripping Springs, TX (US); John F. Pillar, Ottawa (CA)

(72) Inventors: William C. Moyer, Dripping Springs, TX (US); John F. Pillar, Ottawa (CA)

(73) Assignee: NXP USA, Inc., Austin, TX (US)

( * ) Notice: Subject to any disclaimer, the term of this patent is extended or adjusted under 35 U.S.C. 154(b) by 149 days.

(21) Appl. No.: 14/330,331

(22) Filed: Jul. 14, 2014

(65) Prior Publication Data

US 2016/0011907 A1   Jan. 14, 2016

(51) Int. Cl.
G06F 9/46 (2006.01)
G06F 9/50 (2006.01)
G06F 9/48 (2006.01)

(52) U.S. Cl.
CPC .......... G06F 9/5027 (2013.01); G06F 9/4843 (2013.01)

(58) Field of Classification Search
None
See application file for complete search history.

(56) References Cited

U.S. PATENT DOCUMENTS

| | | | | |
|---|---|---|---|---|
| 6,823,516 B1 * | 11/2004 | Cooper | ................ | G06F 1/3203 718/104 |
| 7,340,596 B1 * | 3/2008 | Crosland | ................... | G06F 1/24 713/1 |
| 8,200,799 B2 | 6/2012 | Scheuermann et al. | | |
| 8,566,833 B1 | 10/2013 | Biswas et al. | | |
| 8,576,862 B2 | 11/2013 | Sonnier et al. | | |
| 8,578,088 B2 | 11/2013 | Rousseau | | |
| 8,594,816 B2 | 11/2013 | Jong et al. | | |
| 8,656,125 B2 | 2/2014 | Binzinger | | |
| 2011/0276396 A1 * | 11/2011 | Rathod | ............. | G06F 17/30867 705/14.49 |
| 2013/0111480 A1 * | 5/2013 | Cox | ................. | G06Q 10/06311 718/100 |

FOREIGN PATENT DOCUMENTS

WO   WO2013/021223 A1   2/2013

* cited by examiner

*Primary Examiner* — Emerson Puente
*Assistant Examiner* — Steven Do

(57) ABSTRACT

Configurable per-task state counters for processing cores in multi-tasking processing systems are disclosed along with related methods. In part, the disclosed embodiments include a work scheduler and a plurality of processing cores. The work scheduler assigns tasks to the processing cores, and the processing cores concurrently process multiple assigned tasks using a plurality of processing states. Further, task state counters are provided for each assigned task, and these task state counters are incremented for each cycle that the task stays within selected processing states to generate per-task state count values for the assigned tasks. These per-task state count values are reported back to the work scheduler when processing for the task ends. The work scheduler can then use one or more of the per-task state count values to adjust how new tasks are assigned to the processing cores.

19 Claims, 5 Drawing Sheets

CONFIGURABLE PER-TASK STATE COUNTERS FOR PROCESSING CORES IN MULTI-TASKING PROCESSING SYSTEMS

TECHNICAL FIELD

This technical field relates to multi-tasking processing systems and, more particularly, to task scheduling for multi-tasking processing systems.

BACKGROUND

Multi-tasking processing systems include multiple processors and/or processing cores that provide parallel processing of tasks for the multi-tasking processing system. In some multi-tasking systems, tasks are scheduled at task initiation time by a work scheduler that selects a processing core from a pool of cores that are configured to perform multiple different tasks. Efficient scheduling of tasks to processing resources is desirable as this efficient scheduling improves the overall efficiency of the multi-tasking processing system. Prior solutions have tracked an amount of time a processing core takes to complete a task using a software method based on elapsed time of a free-running counter within the work scheduler. The overall processing times for the tasks to be completed by the processing cores can then be used by the work scheduler to schedule new tasks for the processing cores. The free-running counter, however, provides only general overall task completion time information, and the related software overhead can lead to degraded performance for the multi-tasking processing system.

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale.

DETAILED DESCRIPTION

Figure 1:
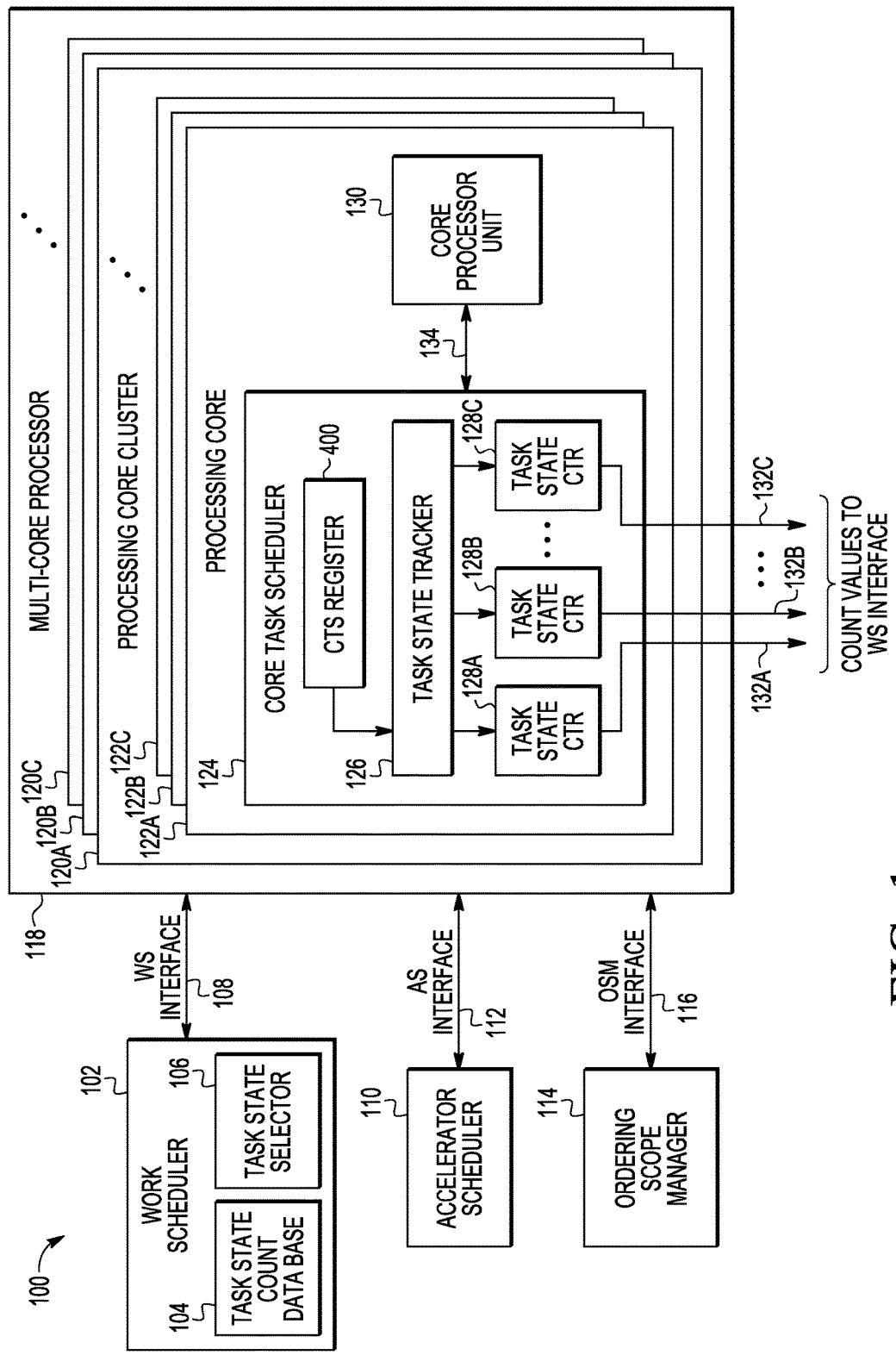
FIG. 1 is a block diagram of an example embodiment for a multi-tasking processing system including a task state tracker and task state counters for each processing core within a multi-core processor.

Configurable per-task state counters for processing cores in multi-tasking processing systems are disclosed along with related methods. In part, the disclosed embodiments include a work scheduler and a plurality of processing cores within a multi-tasking processing system. The work scheduler assigns tasks to the processing cores, and the processing cores concurrently process multiple assigned tasks using a plurality of processing states for each task. Further, task state counters are provided for each assigned task, and these task state counters are incremented for each cycle that the task stays within a selected set of the plurality of processing states while the processing core is processing the task associated with the task state counter. As such, the task state counters generate per-task state count values for the assigned tasks. These per-task state count values are reported back to the work scheduler when processing for the task ends. The work scheduler can then use one or more of the per-task state count values to adjust how new tasks are assigned to the processing cores. Different features and variations can be implemented, as desired, and related or modified systems and methods can be utilized, as well.

In operation, the disclosed embodiments provide configurable counting mechanisms for measuring the amount of time individual tasks spend in various local scheduling states on a processing core or combinations of these local scheduling states. These resulting per-task state count values from these task state counters are then reported back for use in assigning new tasks to the processing cores, such as through a global work scheduler. In example embodiments below, task state information is communicated to a task lifetime counter mechanism by individual task state tracker (TST) state machines located in a core task scheduler within each processing core. Each individual task state tracker (TST) state machine tracks the state of a given task, from the time the task is initially assigned, until the time the task completes and returns to the unassigned state, awaiting reassignment for new work. When a task completes, the processing returns to an initial unassigned task state, and the task lifetime counter value is reported to the global work scheduler for the multi-tasking processing system. This reporting of the count value can be implemented using a hard-wired port or interface that connects the processing core to the global work scheduler. The lifetime counter value from a completing task can then be used by the work scheduler to influence future task assignments to processing cores made by the work scheduler. Further, states to be monitored are individually selectable through configuration settings, and the selected states can be varied over time based upon system events, work scheduler status events, performance feedback, and/or other desired operating parameters. Advantageously, software maintenance of the task lifetime counter logic is not required as the states to be monitored are initially selected and tracked with each processing core.

The disclosed embodiments, therefore, provide a flexible hardware mechanism for accumulating task lifetime execution profiles and for providing feedback to a global work scheduler. Unlike traditional software-based task lifetime timers that rely upon a free-running counter, the disclosed embodiments provide selectable low-level processing state tracking information including local and global hardware task scheduling decisions and conflicts (e.g., waiting states, inhibit states). This state tracking information is then provided directly back to the global work scheduler on task completion, and the global work scheduler can use this per-task processing state information from each processing core to make dynamic adjustments with respect to how new tasks are allocated to the pool of processing cores.

With respect to tracked states and as described below, a task state counter for each assigned task within each processing core is configured to provide information regarding the number of cycles a task spends in particular processing states during its lifetime from initiation to termination by the processing core. In particular, selective control is provided over which states the task state tracker tracks using the task state counter, and this state selection causes the task lifetime counter to accumulate cycles spent in the selected states. The per-task lifetime counters accumulate the number of cycles spent in particular states (e.g., active execution, active acceleration, waiting for execution, execution inhibited, etc.). At the time the task is initiated, the task state counter for the task is initialized (e.g., cleared). At the time the task completes or is terminated, the counter value is published or reported to the global work scheduler, for example, through a hardware interface between the processing core and the work scheduler. The work scheduler then uses the task lifetime counter values from the processing cores within the multi-tasking processing system to determine how to efficiently assign new tasks to the processing cores based upon the task state counter operational history for the processing cores. As such, the disclosed embodiments advantageously provide dedicated per-task state counters, configurable selection of states to be counted, and automatic publishing of the task state lifetime counter values to the global work scheduler upon task termination. This counting of selected task states during task processing and reporting of the resulting counter values provides more specific state information that can be used to more efficiently schedule new tasks as compared to the overall elapsed time provided by prior solutions.

FIG. 1 is a block diagram of an example embodiment for a multi-tasking processing system 100 including a task state tracker 126 and task state counters 128A, 128B ... 128C for each processing core 122A, 122B, 122C ... within the multi-core processor 118. For the example multi-tasking processing system 100, the multi-core processor 118 includes multiple processing core clusters 120A, 120B, 120C ... with each processing core cluster 120A, 120B, 120C ... further including multiple processing cores 122A, 122B, 122C .... Each processing core 122A, 122B, 122C ... further includes a core processing unit 130 and a core task scheduler 124 that manages the tasks processed by the core processing unit 130 through interface 134. The core task scheduler (CTS) 124 further includes task state counters 128A, 128B ... 128C and a task state tracker 126 that tracks processing states for each task currently assigned to a processing core. Specific states selected by the CTS register 400 are monitored for performing updates to the task state counters 128A, 128B ... 128C to count states for each task assigned to the processing core, as described in more detail below. When a task is completed, the resulting per-task state count values 132A, 132B ... 132C are reported by the task state tracker 126. As one further example, four (4) processing core clusters can be provided with each including four (4) processing cores to provide a total of sixteen (16) processing cores within the multi-core processor 118, and each processing core can be configured to have sixteen (16) concurrently assigned tasks to be processed.

In addition to the multi-core processor 118, the multi-tasking processing system 100 also includes a work scheduler 102, a work scheduler (WS) interface 108 to the multi-core processor 118, an accelerator scheduler 110, an accelerator scheduler (AS) interface 112 to the multi-core processor 118, an ordering scope manager 114, and an ordering scope manager (OSM) interface 116. The work scheduler 102 operates to assign tasks to the processing cores 122A, 122B, 122C ... and to receive the resulting per-task state counter values 132A, 132B ... 132C. These values 132A, 132B ... 132C from each of the processing cores 122A, 122B, 122C ... are stored in the task state count database 104, which can be implemented using any desired data storage medium (e.g., dynamic random access memory, FLASH memory, etc.). In one embodiment, the work scheduler 102 also includes a task state selector 106 that provides task state selection commands through the WS interface 108 to the processing cores within the multi-core processor 118. These task state selection commands determine the processing states that are tracked by the task state trackers 126 within the processing cores 122A, 122B, 122C ... as described further below. For other embodiments, the desired task states to be tracked can be determined using different techniques. For example, the states to be tracked could be a fixed set of states for any given task or type of task. Further, the state selections can be made through additional and/or different interfaces for the processing cores. The accelerator scheduler 110 operates to provide acceleration commands to the processing cores 122A, 122B, 122C ... through the AS interface 112, as described in more detail below. And the ordering scope manager 114 provides inhibit and release commands to processing cores 122A, 122B, 122C ... to arbitrate access by the processing cores 122A, 122B, 122C ... to common shared resources, as described in more detail below. Other variations could be implemented as desired.

By providing the configurable per-task state counters 128A, 128B ... 128C within each processing core 122A, 122B, 122C ... with the multi-core processor 118 that track selected processing states for each assigned task, the disclosed embodiments provide significantly improved visibility into the processing states being used by processing cores as compared to prior solutions that simply track an overall time for task completion. For the embodiment 100, the multi-tasking processing system 100 includes a hierarchy of hardware resource schedulers including global work scheduler 102 and the core task schedulers 124 for each of the processing cores 122A, 122B, 122C .... The work scheduler 102 uses the task state count database 104 of count values 132A, 132B ... 132C to more efficiently schedule new tasks to the processing cores 122A, 122B, 122C .... The core task scheduler 124 for each processing core schedules multiple concurrently active tasks assigned to the processing core using various processing states (e.g., waiting, inhibited, accelerating, executing, etc.) as described in more detail below. The task state selector 106 for the work scheduler 102 configures the CTS register 400 for the task state tracker 126 for the processing core so that selected processing states are tracked and counted for the assigned tasks using the per-task state counters 128A, 128B ... 128C. When processing of each task ends (e.g., task processing completed, task terminated, etc.), the resulting count values 132A, 132B ... 132C from the task state counters 128A, 128B ... 128C are published to the work scheduler 102 through the WS interface 108. These count values 132A, 132B ... 132C are then stored in the task state count database 104 and used by the work scheduler to assign new tasks to the processing cores 122A, 122B, 122C ... within the multi-core processor 118. It is further noted that the states selected for tracking can be configured and adjusted over time based upon operational conditions or parameters for the multi-tasking processing system. Other variations could also be implemented.

Figure 2:
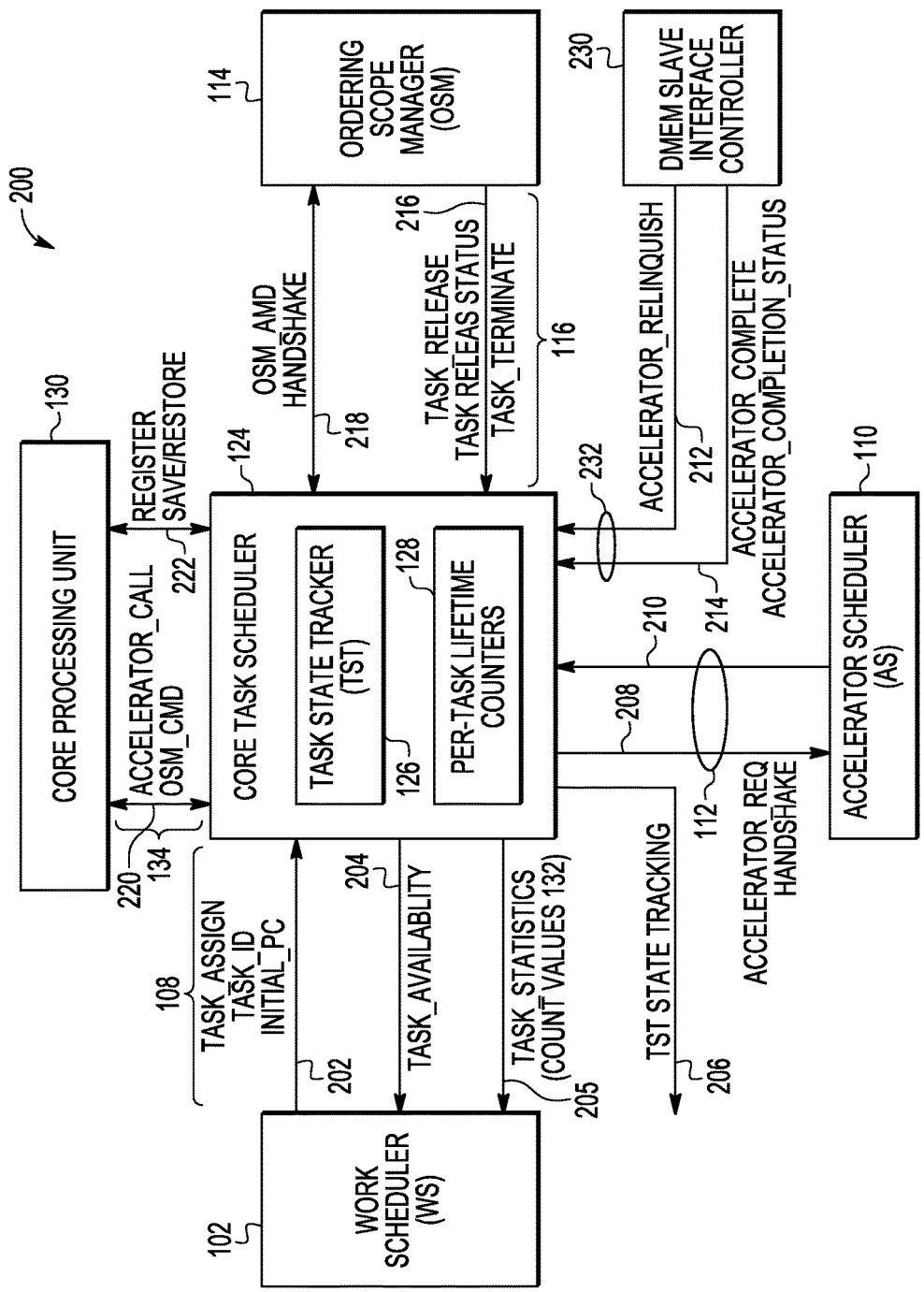
FIG. 2 is a block diagram of an embodiment for example commands that can be communicated among a work scheduler, an accelerator scheduler, an ordering scope manager, and a core processing unit.

FIG. 2 is a block diagram of an embodiment 200 for example commands that can be communicated among the work scheduler (WS) 102, the accelerator scheduler (AS) 114, the ordering scope manager (OSM) 110, and the core processing unit 130. As described above, the core task scheduler 124 includes a task state tracker (TST) 124 and per-task lifetime counters 128.

The ordering scope manager 110 communicates with the core task scheduler 124 through interface 116, and these communications can include OSM handshake information 218 (e.g., OSM_cmd handshake) and shared resource task related information 116 (e.g., Task_release, Task_release_status, Task_terminate) as well as other desired communications between the ordering scope manager 110 and the core task scheduler 124. The accelerator scheduler 114 communicates with the core task scheduler 124 through interface 112, and these communications can include AS handshake information 208 (e.g., Accelerator_req handshake) and AS grant handshake information 210 (e.g., Acclerator_grant handshake) as well as other desired communications between the accelerator scheduler 114 and the core task scheduler 124. The data memory (DMEM) slave interface controller 230 represents an interface to shared memory resources for the processing cores 122A, 122B, 122C . . . , and this controller 230 communicates with the core task scheduler 124 through interface 232 which can include a relinquish command 212 (e.g., Accelerator_relinquish) and completion related information 214 (e.g., Accelerator_complete, Accelerator_completion_status).

The work scheduler 102 communicates with the core task scheduler 124 through interface 108, and these communications can include task related commands 202 (e.g., task assignment commands (Task_assign), task identifier information (task_ID), initial program counter (initial_PC)), task related commands 204 (e.g., task processing availability indicators (Task_availability)), and task results related information 205 (e.g., Task_statistics including the count values 132) as well as other desired communications between the work scheduler 102 and the core task scheduler 124. As described above, the task count values 132A, 132B . . . 132C sent to the work scheduler 102 from each of the processing cores 122A, 122B, 122C . . . can be stored by the work scheduler 102 and used to adjust subsequent assignment of new tasks to the processing cores 122A, 122B, 122C . . . thereby providing more efficient task scheduling for the multi-tasking processing system 100.

The core task scheduler (CTS) 124 communicates with the core processing unit 130 through interface 134, and these communications can include commands 220 (e.g., accelerate call (Accelerator_call) commands and OSM commands (OSM_cmd)) and register commands 222 (e.g., save/restore commands) as well as other desired communications between the core task scheduler 124 and the core processing unit 130. It is also noted that a TST state tracking indicator 206 can also be output by the core task scheduler 124 and used by the multi-tasking processing system 100 for debug purposes and/or for other development support, as desired.

In operation within each processing core, the CTS 124 is responsible for the scheduling of assigned tasks for execution by the core processing unit 130 with that processing core. Task selection can be based on a priority mechanism using relative task age and/or a priority indicator received on task initiation. This priority mechanism is used by the CTS 124 to select among the assigned tasks which are in a ready-to-execute waiting state for the core processing unit 130. Task state tracking is maintained in hardware through the task state tracker 126 that monitors the processing state of each task being processed by the core processing unit 130 as the task is being affected by requests for task ordering, by requests for hardware acceleration, by subsequent completion of acceleration requests, by subsequent ordering constraint satisfaction, and/or by other in-task processing states for the core processing unit 130. It is noted that a task state machine, such as the example embodiment 300 shown in FIG. 3, can be used by the CTS 124 to track the processing states. Further, it is noted that the task state tracker (TSTS) 126 can include such a task state machine 300 for each task in processing cores 122.

Figure 3:
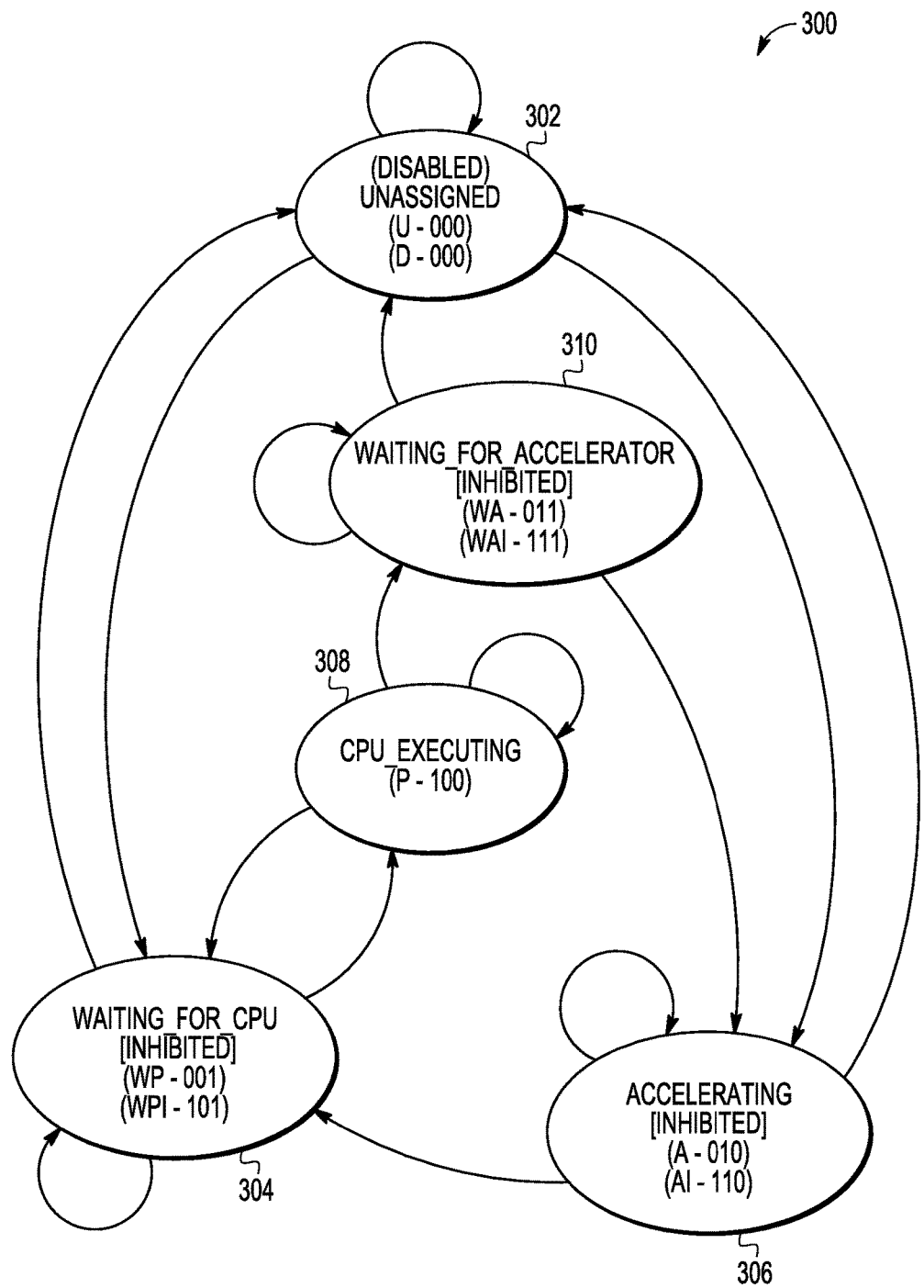
FIG. 3 is an example embodiment for a task state machine that can be used by a core task scheduler and a task state tracker to track states for one or more tasks processed by a processing core.

FIG. 3 is an example embodiment for a task state machine 300 that can be used by CTS 124 and the TST 126 within the CTS 124 to track states for individual tasks within the core processing unit (CPU) 130. The task state machine starts in an unassigned state 302 where the task is unassigned and is available for assignment by the work scheduler 102. Once the task has been assigned work by the work scheduler 102, state 304 is reached if the task is waiting for use of the CPU 130, or state 306 is reached if an accelerating request has been issued for the task. From state 304, flow passes to state 308 when the CPU 130 is executing instructions relating to the task. From state 308, flow can pass back to state 304, or flow can pass to state 310 where an accelerator request has been made by the task, and it is waiting on accelerator availability and scheduling. From state 310, flow can pass back to state 302 if the task is terminated, or flow can pass to state 306 when the accelerating request is being processed. It is also noted that states 304, 306, and 310 can also include inhibit states where task processing by the CPU 130 or accelerators (e.g. via accelerator scheduler 110) is inhibited due to arbitration being controlled by the ordering scope manager 110. The task will be inhibited, for example, where the task is needing to access a shared resource and another task on the same or another processing core has control of the shared resource. The inhibit will be released by the ordering scope manager 110 when priority and access control is available for to the task.

It is noted that the example task state machine 300 uses a 3-bit value to represent the current state for the task state machine. The following TABLE 1 provides an example for these 3-bit values. The example CTS register referred to in the TABLE 1 is described in more detail below.

TABLE 1

EXAMPLE STATES FOR TASK STATE MACHINE

| State | Value | Comments |
| --- | --- | --- |
| Tracking Disabled (D) Unassigned (U) | 000 | The Disabled (D) and Unassigned (U) states have the same 3-bit value and are distinguished by the enable bit setting in the CTS control and status register. |
| Waiting for CPU (WP) | 001 | A task in this state is waiting (ready) for selection to be scheduled to the CPU for execution. |
| Waiting for CPU and Inhibited (WPI) | 101 | The task is in the Waiting for CPU state but is Inhibited. In this Inhibited state, the task is waiting for an Inhibit release (e.g., from the Ordering Scope manager). |

TABLE 1-continued

EXAMPLE STATES FOR TASK STATE MACHINE

| State | Value | Comments |
| --- | --- | --- |
| CPU Executing | 100 | A task is in this state is actively executing on the CPU. |
| Waiting for Accelerating (WA) | 011 | The task in this state is waiting for scheduling to occur on the requested accelerator. |
| Waiting for Accelerating and Inhibited (WAI) | 111 | The task is in the Waiting for Accelerating state but is Inhibited. In this Inhibited state, the task is waiting for an Inhibit release (e.g., from the Ordering Scope manager). |
| Accelerating (A) | 010 | The task in this state has an acceleration operation which has been scheduled to the requested accelerator and is waiting for the acceleration operation to be completed. |
| Accelerating and Inhibited (AI) | 110 | The task is in the Accelerating state but is Inhibited. In this Inhibited state, the task is waiting for an Inhibit release (e.g., from the Ordering Scope manager). |

With respect to the TABLE above, it is noted that state tracking can be set as disabled (D) after reset for the multi-tasking processing system 100. In addition, the state selection bits in the CTS control and status register 400 and the count value within the task state count register (TASKCTR) 500 will be cleared. These registers 400/500 are described in more detail below. It is also noted that state tracking can be enabled and state selection can be made through the CTS register 400, and the state count value can be tracked using the task state count register (TASKCTR) 500, as also described in more detail below. On the initial step of task scheduling being enabled in the CTS 124, the Unassigned (U) state 302 is entered by all tasks. The example processing states shown in FIG. 3 are now described in more detail.

Disabled State (D)/Unassigned State (U).

The Disabled (D) and Unassigned (U) states have the same 3-bit value and are distinguished by the enable bit setting in the CTS control and status register 400. Until task scheduling is enabled, the task state machine stays in the Disabled (D) state. Once task scheduling by the CTS 124 is enabled, the task state machine is placed in the Unassigned (U) state 302 where the processing core 122A waits for a task to be assigned by the work scheduler 102. Once a task is assigned, state 304 or state 306 will be reached. When a task processing state enters the Unassigned (U) state 302 from a state other than the Disabled (D) state, the per-task lifetime state counter value from the task state count register (TASKCTR) 500 is published back to the work scheduler 102 through the WS interface 108 along with an indication that the task processing is complete.

Waiting for CPU State (WP).

A task in this Waiting for CPU state 304 is waiting (e.g., ready) for selection by the CTS 124 to be scheduled to the CPU 130 for execution. Many tasks can be in this state simultaneously for a processing core, but only one ready task will be selected as the next task to execute on the CPU 130. This selection can be made by the CTS 124 based upon task priority (e.g., position in a task scheduling list) and/or other desired parameters. The task selected for execution is allowed to transition to the CPU Executing (P) State 308 when the CPU 130 becomes available for use (i.e. when a task currently executing on the CPU 130 exits its state 308), while other non-selected tasks remain within their state 304. It is noted that a higher priority task received by the processing core can cause the currently selected task to lose scheduling priority and be placed back in state 304.

Waiting for CPU State—Inhibited (WPI).

A task within an Inhibited state within the Waiting for CPU state 304 is waiting for an inhibit release command or a task terminate command. Many tasks can be in this state simultaneously for a given processing core. If the inhibit state is released, the task remains in the Waiting for CPU state 304 until it is selected for execution.

CPU Executing State (P).

A task is this state 308 is actively executing on the CPU 130. The task will_remain in execution until it executes an accelerator call and transitions to state 310, or it yields to a higher priority task which causes it to transition back to state 304.

Waiting for Accelerator State (WA).

A task in this state 310 is waiting for scheduling to occur with respect to an accelerator request issued by the task. Accelerator tasks are tasks to be performed by a processing resource outside of the processing core itself, and these processing resources can be shared by the multiple different processing cores. As such, a processing core may have to wait for another processing core to finish with the processing resource before the accelerator task can be processed. Once an accelerator request is scheduled, the task transitions to state 306 where the accelerating resource processes the request.

Waiting for Accelerator State—Inhibited (WAI).—

A task in an Inhibited state within the Waiting for Accelerator state 310 is waiting for an inhibit release command or a task terminate command. Many tasks can be in this state simultaneously for a given processing core. If the inhibit state is released, the task remains in the Waiting for Accelerator state 310 until the accelerator request is scheduled.

Accelerating State (A).

A task in this state 306 has an acceleration operation which has been scheduled to the requested accelerator and is waiting for the acceleration operation to complete. Once the acceleration operation is complete, the task transitions back to state 304.

Accelerating State—Inhibited (AI).

A task in an Inhibited state within the Accelerating state 306 is waiting for an inhibit release command or a task terminate command. Many tasks can be in this state simultaneously for a given processing core. If the inhibit state is released, the task remains in the Accelerating state 306 until the acceleration operation is complete.

Task Terminate Command.

A task terminate command can be received for a task while within any of the above states other than state 302. If a task terminate request is received, the task will be terminated and transition back to the Unassigned state 302. As indicated above, when the task moves back to the Unassigned state 302 an indication is sent back to the work scheduler 102 of the counter value for the task state count register for that task.

Figure 4:
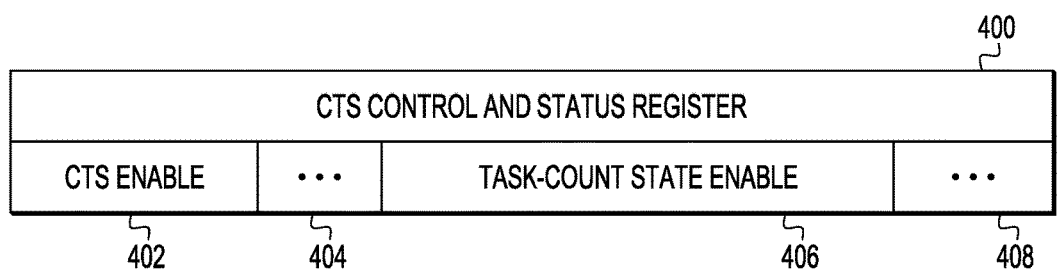
FIG. 4 is an example embodiment for a control and status register for a core task scheduler including an enable field and a task-count state enable field.
Figure 5:
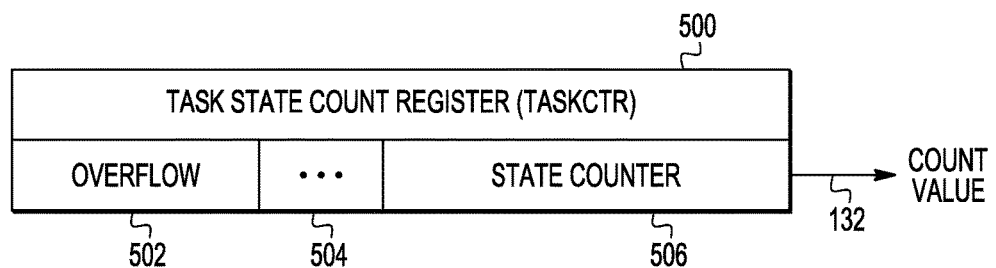
FIG. 5 is an example embodiment for a task state count register including an overflow field and a state counter field.

FIGS. 4 and 5 are now discussed and provide example embodiments for a CTS control and status register 400 and a task state count register (TASKCTR) 500. These registers can be included with the CTS 124. It is noted that a task state count register 500 can be provided within CTS 124 for each task that can be concurrently assigned to the processing core. For example, if the processing core can be concurrently assigned eight (8) tasks, then eight task state count registers 500 can be provided and correspond to the task state counters 128A, 128B ... 128C shown in FIG. 1. Further, it is noted that a single control and status register 400 can be included within CTS 124 and used to determine the states counted for each task, or different additional registers and/or register fields could be used to provide different selections for different processing cores. Other variations and techniques for counting selected states for tasks could also be used while still taking advantage of the per-task processing state counters and related techniques described herein.

Looking now to FIG. 4, the example embodiment for a CTS control and status register 400 includes a CTS enable field 402 and task-count state enable field 406. Other fields can also be provided within the CTS control and status register 400, as desired, such as fields 404 and 408.

The CTS enable field 402 can be used to enable the per-task state counting described herein. For example, the multi-tasking processing system 100 can allow the CTS enable field 402 to be accessed and written by users of the multi-tasking processing system 100 to selectively enable or disable the task scheduling function, and thus per-task state counting. In one example embodiment, the CTS enable field 402 is a one-bit indicator. Further, a zero (0) written to the CTS enable field 402 can be used to disable core task scheduling and per-task state counting, and a one (1) written to the CTS enable field 402 can be used to enable core task scheduling and per-task state counting.

The task-counter state enable field 406 can be used determine the states that will be counted when the per-task state counting is enabled. For example, the multi-tasking processing system 100 can allow the task-counter state enable field 406 to be accessed and written by users of the multi-tasking processing system 100 to select the processing states counted for the per-task state counting. The task-counter state enable field 406 can also be configured through the task state selector 106 within the work scheduler 102. As a further example, five (5) bits could be used for the task-counter state enable field 406 with each bit determining whether or not certain processing states are counted. TABLE 2 below provides an example for how states could be selected using a 5-bit task-counter state enable field 406. It is noted that for the example in TABLE 2, setting one of the bits to a one (1) will enable counting of the associated states, and setting one of the bits to zero (0) will disable counting of the associated states.

TABLE 2

EXAMPLE SETTINGS AND STATE SELECTIONS
FOR PER-TASK STATE COUNTING

| Register Setting | Processing States to be Counted |
|---|---|
| 1xxxx | Each task's TASKCTR counter is enabled when the task is in CPU_Executing (P) state |

TABLE 2-continued

EXAMPLE SETTINGS AND STATE SELECTIONS
FOR PER-TASK STATE COUNTING

| Register Setting | Processing States to be Counted |
|---|---|
| x1xxx | Each task's TASKCTR counter is enabled when the task is in the Accelerating (A) or Accelerating-Inhibited (AI) state |
| xx1xx | Each task's TASKCTR counter is enabled when the task is in either the Waiting for CPU Inhibited (WPI) state or Waiting for Accelerator Inhibited (WAI) state |
| xxx1x | Each task's TASKCTR counter is enabled when the task is in the Waiting for Accelerator (WA) state and is not in an Inhibited state. |
| xxxx1 | Each task's TASKCTR counter is enabled when task is in Waiting for CPU (WP) state and is not in an Inhibited state |

Looking now to FIG. 5, the example embodiment for a task state count register (TASKCTR) 500 includes an overflow field 502 and state counter field 506. Other fields can also be provided within the task state count register (TASKCTR) 500, as desired, such as fields 504.

The overflow field 502 can be used to indicate that a counting overflow has occurred with respect to the state counter field 506. In one example embodiment, the overflow field 502 can be configured as a one-bit indicator. A zero (0) value within the overflow field 502 can be used to represent that no overflow is present for the task. A one (1) value within the overflow field 502 can be used to represent that an overflow has occurred for the state counter field 506. If such an overflow occurs indicating that all ones (1s) are present in the state counter field 506, further updates to the count value 132 within the state counter field 506 are disabled. Further, the multi-tasking processing system 100 can be configured allow the overflow field 502 to be accessed and written such that the overflow field 502 can be forced to a one (1) value even though an overflow has not yet occurred. This setting of the overflow field 502 to a one (1) effectively freezes the count value 132 within the state counter 506 as further updates to the count value 132 are disabled for the task processing.

The state counter field 506 can be used to count the states selected for counting. The state counter field 506 is updated each cycle for the processing core if a task state selected for counting has occurred that cycle for the task. As described herein, the resulting count value 132 is published to the work scheduler 102 through the WS interface 108 when each task completes or terminates. For one example embodiment, twenty (20) bits are used for the state counter field 506, although smaller or larger numbers of bits could also be used, as desired, depending upon the numbers of cycles expected to be counted for the tasks to be processed by the processing cores.

Thus, based upon the example embodiments of FIG. 4 and FIG. 5, each task assigned to a processing core has an associated task state count register 500 that is used to count cycles the task spends in selected processing states. The selection of the states is controlled by the settings applied to the task-count state enable field 406 in the CTS control and status register 400. While this can be a global control value applied across all tasks within a processing core to determine states counted using the task state count registers 500, individual or group controls could also be provided, if desired. On task termination, the count value 132 of the state counter field 506 for each terminating task is published to the work scheduler 102. For example, the count value 132 can be driven as data on the WS interface 108 during the cycle the task enters the Unassigned state 302, such as after task completion or task termination. Other variations could also be implemented while still taking advantage of the per-task processing state counters and related techniques described herein.

Figure 6:
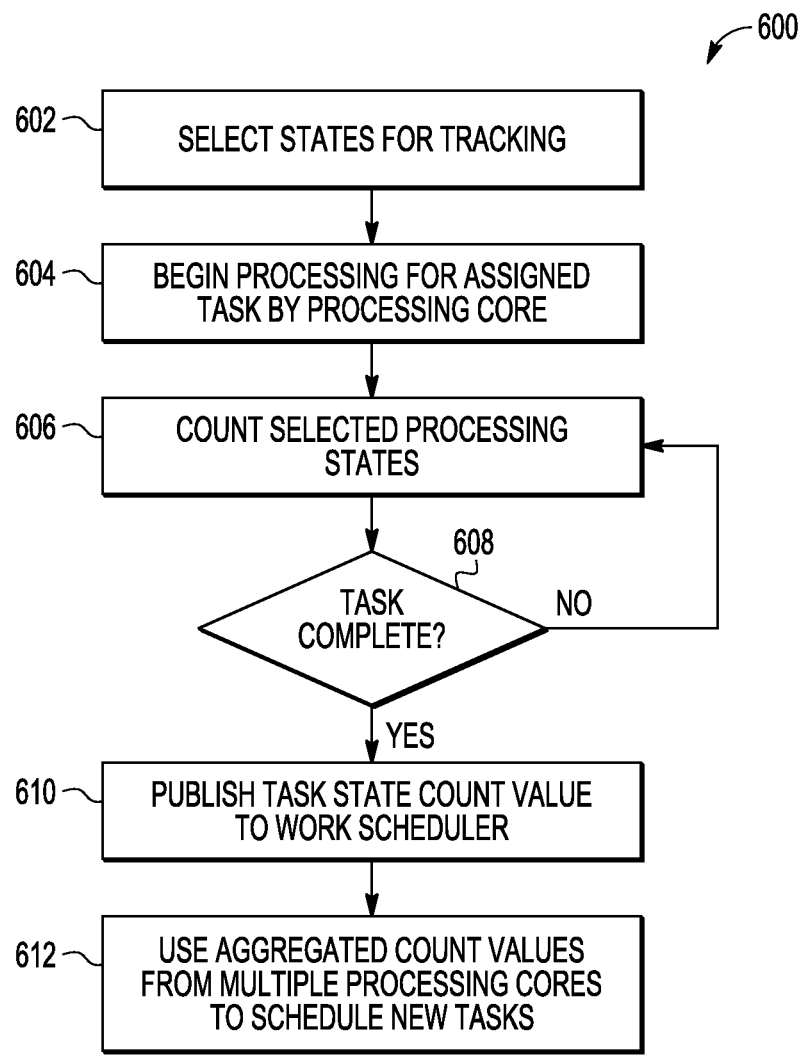
FIG. 6 is a process flow diagram of an example embodiment for determining per-task processing state counter values and using these counter values to schedule new tasks.

FIG. 6 is a process flow diagram of an example embodiment 600 for determining per-task processing state counter values and using these counter values to schedule new tasks. In block 302, processing states for a processing core are selected for tracking. In block 604, the processing core begins processing for an assigned task. In block 606, the selected processing states are counted. In block 608, a determination is made whether processing of the task is complete. If "NO," then flow passes back to block 606. If "YES," then flow passes to block 610. In block 610, the task state count value is published to the work scheduler for the multi-tasking processing system. In block 612, aggregated count values from multiple processing cores within the multi-tasking processing system are used by the work scheduler to schedule new tasks for the processing cores. It is noted that additional and/or different processing steps could also be used while still taking advantage of the per-task processing state counters and related techniques described herein.

As described herein, a variety of embodiments can be implemented and different features and variations can be implemented, as desired.

In one embodiment, a method is disclosed for operating a multi-tasking processing system including assigning tasks to a plurality of processing cores for a multi-tasking processing system where each processing core is configured to process multiple assigned tasks using a plurality of processing states. At each processing core, the method further includes concurrently processing the multiple assigned tasks using the plurality of processing states and for each task, counting processing cycles that the task stays within a selected set of the plurality of processing states to generate a per-task state count value for the task.

For further embodiments, the method includes at each processing core reporting the per-task state count values to a work scheduler for the multi-tasking processing system. For additional embodiments, the method includes selecting the set of the plurality of processing states for each processing core. Further, the method can include adjusting the set of the plurality of processing states for each processing core based upon at least one of an operational state of the multi-tasking processing system or performance of the multi-tasking processing system. Still further, the selecting step can include setting one or more bits within a configuration register for each processing core to select the set of the plurality of processing states. In addition, the method can further include setting one or more bits within the configuration register for each processing core to enable or disable task state counting.

For still further embodiments, the plurality of processing states can include at least one of an unassigned state, a waiting state, an inhibit state, an accelerating state, or an executing state. For additional embodiments, the method can include storing the per-task state count values from the plurality of processing cores in a data storage medium. Further, the method can also include assigning one or more new tasks to the plurality of processing cores based upon one or more of the stored per-task state count values. For additional embodiments, the counting step for each task can include incrementing a value within a counter field for a count register for each task being concurrently processed by the processing core. Still further, the method can also include setting one or more bits within the count register to indicate an overflow condition and to disable further counting.

In another embodiment, a multi-tasking processing system is disclosed that includes a plurality of processing cores where each processing core being configured to concurrently process multiple tasks using a plurality of processing states, and a work scheduler processor configured to assign tasks to the plurality of processing cores. At each processing core, the system further includes a core task scheduler configured to schedule processing of the multiple tasks within the processing core, a plurality of task state counters where each task state counter is associated with one of the multiple tasks, and a task state tracker configured to increment each task state counter for each processing cycle that the task associated with that task state counter stays within a selected set of the plurality of processing states to generate a per-task state count value for each task.

For further embodiments, each processing core can be further configured to report the per-task state count values from the task state counters to the work scheduler. In addition, the system can include a data storage medium configured to store the per-task state count values from the plurality of processing cores. Further, the work scheduler can be further configured to assign one or more new tasks to the plurality of processing cores based upon one or more of the stored per-task state count values.

For still further embodiments, each of the plurality of processing cores can be further configured to allow programmable selection of the set of the plurality of processing states. In addition, the system can further include a configuration register associated with each core task scheduler, and one or more bits within the configuration register can be used to select the set of the plurality of processing states. Further, one or more bits within the configuration register can be used to enable or disable task state counting. For additional embodiments, the plurality of task state counters can each include a count register having a counter field. Still further, one or more bits within each count register can be used to indicate an overflow condition and to disable further counting.

It is noted that the functional blocks, devices, and/or circuitry described herein, including those described with respect to the work scheduler 102, the accelerator scheduler 110, the ordering scope manager 114, and/or the multi-core processor 118, can be implemented using hardware, software, or a combination of hardware and software. In addition, one or more processing devices executing software and/or firmware instructions can be used to implement the disclosed embodiments. It is further understood that one or more of the operations, tasks, functions, or methodologies described herein can be implemented, for example, as software, firmware and/or other program instructions that are embodied in one or more non-transitory tangible computer readable mediums (e.g., data storage devices, FLASH memory, random access memory, read only memory, programmable memory devices, reprogrammable storage devices, hard drives, floppy disks, DVDs, CD-ROMs, and/or any other tangible storage medium) and that are executed by one or more central processing units (CPUs), controllers, microcontrollers, microprocessors, hardware accelerators, processors, and/or other processing devices to perform the operations and functions described herein.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. A method for operating a multi-tasking processing system, comprising:
assigning multiple tasks to each of a plurality of processing cores for a multi-tasking processing system, each processing core being configured to process the multiple tasks using a plurality of processing states;
at each processing core:
concurrently processing the multiple tasks using the plurality of processing states; and
for each of the multiple tasks:
enabling counting of processing of cycles for two or more of the plurality of processing states and disabling counting of processing cycles for one or more of the plurality of processing states, wherein the plurality of processing states for which counting is selectively enabled and disabled comprises at least a waiting state, an inhibit state, and an executing state; and
generating a per-task state count value for the task, wherein the per-task state count value represents a number of processing cycles spent in the two or more processing states for which counting is enabled and does not represent an overall time for the task from initiation to completion;
assigning new tasks to each of the plurality of processing cores based upon the per-task state count values generated by the plurality of processing cores; and
processing the new tasks using the plurality of processing cores.

2. The method of claim 1, wherein at each processing core, the method further comprises reporting the per-task state count values to a work scheduler for the multi-tasking processing system.

3. The method of claim 1, further comprising for each processing core selecting processing states to track for that processing core.

4. The method of claim 3, further comprising adjusting the selected processing states for each processing core based upon at least one of an operational state of the multi-tasking processing system or performance of the multi-tasking processing system.

5. The method of claim 3, wherein the selecting step comprises setting one or more bits within a configuration register for each processing core to select the processing states.

6. The method of claim 5, further comprising setting one or more bits within the configuration register for each processing core to enable or disable task state counting.

7. The method of claim 1, wherein the plurality of processing states for which counting is selectively enabled and disabled further comprises at least one of an unassigned state and an accelerating state.

8. The method of claim 1, further comprising storing the per-task state count values from the plurality of processing cores in a data storage medium.

9. The method of claim 1, wherein the generating step for each task comprises incrementing a value within a counter field for a count register for each task being concurrently processed by the processing core.

10. The method of claim 9, further comprising setting one or more bits within the count register to indicate an overflow condition and to disable further counting.

11. A multi-tasking processing system, comprising:
a plurality of processing cores, each processing core being configured to concurrently process multiple tasks using a plurality of processing states; and
a work scheduler processor configured to assign multiple tasks to each of the plurality of processing cores and to assign new tasks to each of the plurality of processing cores based upon per-task state count values generated by the plurality of processing cores;
wherein each processing core comprises:
a core task scheduler configured to schedule processing of the multiple tasks within the processing core;
a plurality of task state counters, each task state counter being associated with one of the multiple tasks; and
a task state tracker configured to enable counting of processing of cycles for two or more of the plurality of processing states and to disable counting of processing cycles for one or more of the plurality of processing states, wherein the plurality of processing states for which counting is selectively enabled and disabled comprises at least a waiting state, an inhibit state, and an executing state;
wherein the task state tracker is further configured to generate a per-task state count value for each task using the plurality of task state counters, the per-task state count value for each task representing a number of processing cycles spent in the two or more processing states for which counting is enabled and does not represent an overall time for the task from initiation to completion; and
wherein the plurality of processing cores are further configured to process the new tasks.

12. The multi-tasking system of claim 11, wherein each processing core is further configured to report the per-task state count values from the task state counters to the work scheduler processor.

13. The multi-tasking processing system of claim 12, further comprising a data storage medium configured to store the per-task state count values from the plurality of processing cores.

14. The multi-tasking processing system of claim 11, wherein each of the plurality of processing cores is further configured to allow programmable selection of the processing states to track for that processing core.

15. The multi-tasking processing system of claim 14, further comprising a configuration register associated with each core task scheduler, and wherein one or more bits within the configuration register are used to select the processing states.

16. The multi-tasking processing system of claim 15, wherein one or more bits within the configuration register are used to enable or disable task state counting.

17. The multi-tasking processing system of claim 11, wherein the plurality of task state counters each comprise a count register having a counter field.

18. The multi-tasking processing system of claim 17, wherein one or more bits within each count register are used to indicate an overflow condition and to disable further counting.

19. The multi-tasking processing system of claim 11, wherein the plurality of processing states for which counting is selectively enabled and disabled further comprises at least one of an unassigned state and an accelerating state.

* * * * *